Sept. 14, 1926.
V. A. FYNN
1,599,759
SYNCHRONOUS MOTOR
Filed March 24, 1924
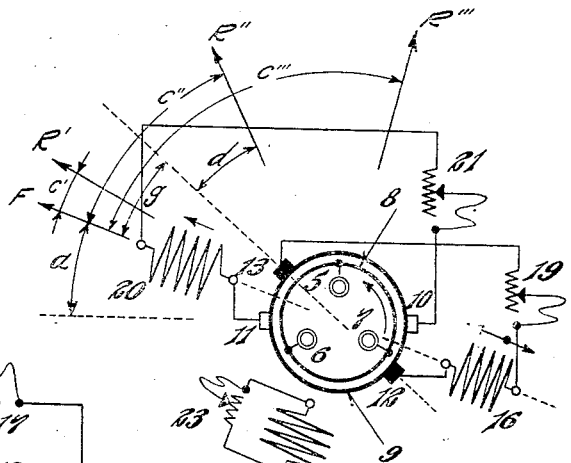
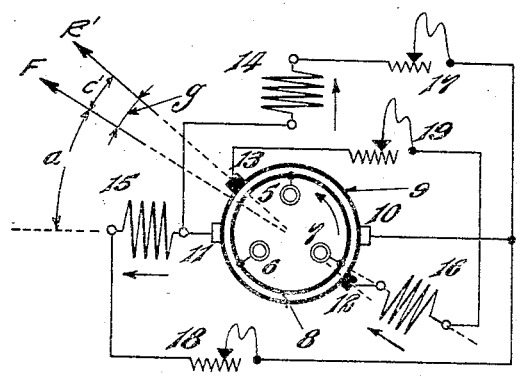
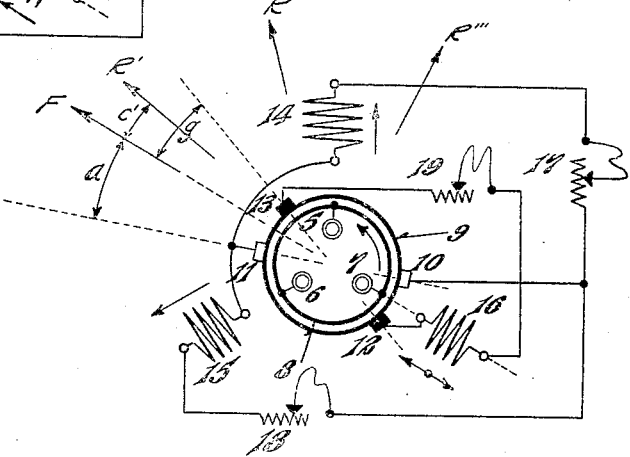
Inventor.
VALÈRE ALFRED FYNN.
By John H. Bruninga
Attorney.

Patented Sept. 14, 1926.

1,599,759

UNITED STATES PATENT OFFICE.

VALÈRE ALFRED FYNN, OF ST. LOUIS, MISSOURI.

SYNCHRONOUS MOTOR.

Application filed March 24, 1924. Serial No. 701,463.

My invention relates to the starting and operating of polyphase synchronous induction motors of the self-excited and the separately-excited type but in some of its aspects it is applicable to single-phase synchronous induction motors.

The objects and features of this invention will appear from the detail description taken in connection with the accompanying drawings and will be pointed out in the claims.

In the accompanying diagrammatic two-pole drawings, Figs. 1, 2 and 3 show three embodiments of my invention as applied to self-excited polyphase synchronous induction motors with revolving primaries.

Referring to Fig. 1, the rotor is the primary and carries a three-phase winding 8 adapted for connection to a polyphase supply through the sliprings 5, 6, 7. It also carries a commuted winding 9 with which co-operate the brushes 10, 11 and 12, 13 located along different axes. The stator, here the secondary, carries two coaxial windings 20 and 16 and a winding 22 displaced by ninety electrical degrees and adapted to be shunted and shortcircuited by the adjustable resistance 23. The windings 20 and 16 are located in an axis displaced from that of the brushes 10, 11 which are connected to the winding 20. The brushes 12, 13 are connected to the winding 16 and displaced from the axis thereof. An adjustable resistance 19 is included in the circuit of the winding 16 and a similar resistance 21 in that of 20. The brushes 10, 11 are so connected to and displaced from 20 that the revolving flux set up by the primary produces or generates at said brushes and at sub-synchronous speeds a voltage which leads that which it concurrently generates in the winding 20. The brushes 12, 13 are so connected to and displaced from 16 that the voltage generated at said brushes by the primary revolving flux lags behind that which this same flux concurrently generates or induces in the winding 16. In practice the angle $a$ may be about 20 degrees, and the angle $g$ may be anything from zero to about 30 degrees, making the angular displacement between the brushes 11 and 13 from 20 to 50 electrical degrees. These angles are given as those which I believe will usually give the more desirable results in practice but are not by any means the only angles which can be used.

In Fig. 2 the rotor carries a polyphase winding 8 provided with three sliprings 5, 6, 7 and a commuted winding 9 with which co-operate two displaced sets of brushes 10, 11 and 12, 13. The stator carries two windings 14, 15 displaced by ninety electrical degrees and a third winding 16. The brushes 10, 11 are located in the axis of the winding 15 and connected to that winding and to 14. The connections are such that the voltage these brushes impress on 15 at sub-synchronous speeds is cophasal with the voltage concurrently generated in that winding by the primary revolving flux while this brush voltage leads by ninety degrees that concurrently generated by the primary revolving flux in 14. The resultant magnetization produced by the windings 14 and 15 at synchronism falls along the axis of the arrow F and is displaced by $a$ degrees from the axis of the brushes 10, 11. The winding 16 is located in the axis of this resultant magnetization and connected to the brushes 12, 13 shown as displaced from the axis of 16. This displacement is such that at sub-synchronous speeds the voltage at the brushes 12, 13 lags behind the voltage generated in 16 by the primary revolving flux. In practice $a$ may be about 20 degrees or more and $g$ may be from zero to about 30 electrical degrees or more. Other angular displacements are useful and possible.

In Fig. 3 the rotor is identical with that in the other figures but the stator carries a polyphase arrangement of windings 14, 15, 16 which in this case are equally spaced at 120 electrical degrees like a regular three-phase winding. The windings 14, 15 are connected in parallel and to the brushes 10, 11 similarly to the windings 14, 15 of Fig. 2. At synchronism these windings produce a resultant magnetization which falls in the direction of the arrow F. The axis of the brushes 10, 11 is displaced by about 20 degrees from that of F. These brushes are so connected to and displaced from the windings 14 and 15 that the slip frequency voltage at said brushes leads the slip frequency voltage in 14 and lags behind the slip frequency voltage in 15. Furthermore, the lead is in excess of the lag. In other words, the slip frequency voltage at the brushes 10, 11 leads the slip frequency voltage of a single winding located in the axis F and producing a magnetization equal to the vectorial sum of the magnetizations produced by 14 and 15. The third phase 16 of the secondary is located in the axis of F, which bisects the angular displacement between 14 and 15 and is connected to the brushes 12, 13 so displaced from the axis of 16 that the slip frequency voltage at said brushes lags behind the slip frequency voltage in 16. The brushes, 12, 13 are displaced from 16 by 20 and from the brushes 10, 11 by 40 electrical degrees. The two brush sets are symmetrically located with respect to the axis of the resultant unidirectional magnetization F produced by the secondary at synchronism. In each of the secondary winding circuits is an adjustable resistance 17, 18, 19.

The operation of Fig. 1 is as follows: To start the motor the circuits of the windings 22 and 20 or 16 or both 20 and 16 are closed over the adjustable resistances in their circuit and the sliprings connected to the supply. As the motor gathers speed the resistance 23 is reduced to zero in one or more steps and the resistances 19 and 21 set to their synchronizing and then to their operating values if these happen to differ from each other or from their respective starting values. At synchronism the winding 22 is inactive and the automatic regulation of the motor or its compounding characteristic or its power factor curve depends on the position of the brushes with respect to the secondary windings to which they are connected and on the proportioning of said windings and the resistance of their circuits.

The motor of Fig. 1 without the winding 16 and the brushes 12, 13 is known. Apart from the fact that the winding 22 is inactive at synchronism the possibilities of varying the automatic compounding or operating characteristic of the motor without 16 are limited to changing the location and magnitude of the arc through which the resultant motor magnetization R travels with changing load and therefore permit of but restricted modifications of the change in the D. C. exciting voltage or D. C. exciting ampereturns on the secondary with changing load.

Thus the angle $a$ can be chosen small, say about twenty electrical degrees, and the winding 20 and the resistance of its circuit can be so dimensioned that a fairly large synchronous overload capacity can be secured with leading no-load and leading full load power factor but such power factor conditions are not always desirable, particularly in the case of larger machines which are usually separately excited and, in general, the greater the synchronous overload capacity the more useful the machine. In this known machine the axis of the secondary unidirectional magnetization F remains stationary at synchronism with respect to the secondary member while the resultant motor magnetization R, which is the resultant of F and the primary armature reaction, moves further and further away from F against the direction of rotation of the primary as shown by R', R'' and R''' of Fig. 1. At no-load R may be made to practically coincide with F, as shown by R' in Fig. 1. At no-load the available exciting voltage at the brushes 10, 11 is then practically proportional to sine $a$ or more exactly to sine $(a+c')$ where $c'$ is the angular displacement between F and R'. At a higher load this voltage is about proportional to sine $(a+c'')$ and so on. The maximum exciting voltage and therefore the maximum excitation is reached when $(a+c)=90$ electrical degrees; for a further increase of $c$ the exciting voltage decreases and the synchronous torque limit is usually in this neighborhood. If the angle $a$ is made too small the operation of the machine becomes unstable and as a practical matter the available increase in exciting voltage and therefore in exciting ampereturns is restricted to about the variation of the sine of an angle which varies from, say, 15 to 90 degrees. Not only is this increase insufficient in order to secure a fairly constant power factor in a machine the material of which is moderately well utilized, but the rate of this increase is the reverse of what is ought to be. The sine of an angle, for instance of $(a+c)$, varies much faster for a given angular displacement near zero degrees than it does for the same displacement near 90 degrees, but, because of saturation of the iron of the magnetic circuit and because of other reasons, excitation should increase faster for a given change in load near full load or at overloads than it does for the same change near no-load. Light loads occur at small and heavy loads at large values of $(a+c)$.

Now in order to improve this condition which is inimical to the best utilization of the active material of a synchronous motor and also to improve the synchronizing torque of this machine, I have imagined a means for further controlling or varying the total unidirectional magnetization produced by the secondary of a synchronous motor. This means consists, generally speaking, of producing a superposed or additional and more or less coaxial unidirectional magnetization on the secondary and causing it to vary with load in a manner which differs from that in which the original, initial or basic unidirectional secondary magnetization varies as the load varies. In order to improve the synchronizing torque, and this appears very necessary if the overload capacity and the output for weight of the motor is increased as otherwise full advantage cannot always be taken of such an improvement, I have conceived the idea of so arranging the means just outlined that they will automatically be fully effective in producing additional synchronizing torque at sub-synchronous speeds but will have little or no effect on the performance of the motor at no-load, again becoming more and more effective as the load increases.

In carrying these improvements into practice in Fig. 1, I have disposed the winding 16 in the axis of 20 and so located the brushes 12, 13 connected to this winding that at no-load and synchronous operation the axis of the resultant motor magnetization R' falls between the axis of 20 and that of the brushes 12, 13, causing the winding 16 to produce a magnetization opposing that produced by 20. As the load increases the opposing ampereturns in 16 diminish, become zero and then reverse, now adding to the magnetization produced by 20. From this point on the additional exciting or compounding or auxiliary voltage at the brushes 12, 13 rises very fast because about proportional to the sine of the here small angle $d$ between R and the axis of 12, 13. Concurrently the exciting or auxiliary voltage at the brushes 10, 11 rises much slower because $(a+c'')$ is considerably greater than $d$, with the result that the total magnitude of F increases very much faster with increasing load as when the brushes 10, 11 and the winding 20 only are used. It is now possible to run at no-load with a much lower value of F and yet reach the same or an even greater value of F at maximum load. If the brushes 12, 13 are placed coaxially with R', which is the space position of R at no-load, then the ampereturns in 16 will be zero at no-load and increase with the sine of $d$ as the load increases. If the brushes 12, 13 are placed coaxially with F at no-load then even at no-load the ampereturns in 16 will add to the magnitude of F and will increase as the sine of $c$. Generally speaking, one of the exciting or auxiliary voltages, that at the brushes 10, 11, will increase as the sine of $(a+c)$ and the other as the sine of $(c-g)$ where $g$ is the angular displacement of the brushes 12, 13 from the unidirectional magnetization F of the secondary and where angular displacements against rotation of the primary are looked upon as positive.

The effect of the improvement on the synchronizing torque is about as follows. With the brushes 12, 13 coaxial with F and 16, the winding 16 will produce a strictly unidirectional and pulsating torque, greatly helping to synchronize the machine with heavy loads because the amplitude of this torque depends on the maximum voltage available from the winding 9. As soon as synchronism is reached, the brush voltages become unidirectional and the position of the brushes 12, 13 is such that at light loads the voltage they collect is very small and only a fraction of the maximum available. At full load, and because of the then altered position of R, this voltage is nearly equal to the maximum available during the synchronizing period. From the point of view of the synchronizing torque the best position of the brushes 12, 13 is that of coincidence with the axis of 16. Small departures from this position have very little influence on the synchronizing torque but a marked effect on the compounding characteristic. Any displacement of the axis of a set of commutator brushes from the axis of the secondary winding to which they are connected causes the synchronizing torque to deviate from strict unidirectionality and to become alternating. For a displacement of 90 electrical degrees this torque is an alternating torque of double slip frequency with equal positive and negative maxima. For a displacement of 45 electrical degrees a negative maximum is only about 18 per cent of a positive maximum and the latter last three times as long as the former. Furthermore the positive maximum is only about 18 per cent less than the positive maximum available when the synchronizing torque is strictly unidirectional. Whenever the torque is an alternating one with unequal positive and negative maxima it can be decomposed into a strictly undirectional torque and an alternating torque of double slip frequency with equal positive and negative maxima. For a displacement of 45 degrees, for example between the axis of the brushes 12, 13 and that of the winding 16 to which they are connected, the amplitude of the unidirectional synchronizing torque component is theoretically double that of the double frequency alternating component and as long as the amplitude of the double frequency component does not materially exceed half the amplitude of the unidirectional component the resultant synchronizing torque can be considered as substantially unidirectional. Also from the synchronizing point of view it is best, if the brushes 12, 13 must be displaced, to displace them in the direction of rotation of the primary so as to have the slip frequency brush voltage lead the slip frequency voltage in 16 but the opposite displacement is generally desired because of compounding requirements and a compromise becomes necessary. It is an easy compromise to make because the displacement of the brushes 12, 13 against the rotation of the primary, is needed at all for compounding requirements, is usually so small as not to materially affect the synchronizing torque produced by 16.

It will be recognized that the winding 16 need not be absolutely coaxial with 20. If it is somewhat displaced, not only will the magnitude of F change with changing load but also its space location, and F will move in or against the direction of rotation of the primary according to whether 16 is displaced from the axis of 20 in or against said rotation. In this way the compounding characteristic can be still further influenced.

In Fig. 1 the winding 22 is needed for a synchronous operation, but is idle at synchronism with the result that the active material of the machine is not fully utilized at the time when the highest output and the highest efficiency are naturally desired. The arrangement of Fig. 2 overcomes this drawback and this embodiment of the invention can be operated as follows. The resistances 17, 18, and 19 if desired, are set to give the desired torque and the sliprings connected to the supply. The windings 14 and 15 are displaced by 90 electrical degrees and because closed over the brushes 10, 11 and the commuted winding 9 act just like the two phase secondary of a polyphase slipring motor and are entirely capable of promptly starting the motor and bringing it close to synchronism as an induction motor. If the circuit of the winding 16, although not symmetrically located with respect to the others, is also closed at starting it will add to the induction motor torque while somewhat unbalancing same. In most cases it is simpler, in so far as switching is concerned, to leave 16 in circuit at starting as well as during the synchronizing and operating periods. Near synchronism all three windings very materially contribute to the synchronizing ability of the motor and at synchronism all three windings contribute to the automatic regulation of the motor exactly as has been explained in connection with Fig. 1 except that the arrangement of Fig. 2 is much more flexible even at synchronism.

In Fig. 1 the magnetization governed by the voltage at the brushes 10, 11 is fixed in space and its axis must always coincide with that of the winding 20. In Fig. 2 the axis of this magnetization can be displaced to a considerable extent by varying the resistance of the circuit of the winding 14 or that of the circuit of the winding 15 or by varying the resistance of both of these circuits. By this means the compounding characteristic may be adjusted over a very wide range by displacing the axis of the resultant magnetization due to 14 and 15 with respect to the axis of the brushes 10, 11 and the axis of 16. The synchronizing performance can also be varied by this means. Reducing the resistance of 15 and increasing that of 14 results in a larger unidirectional and pulsating and in a smaller double slip frequency torque. In so far as 16 or any other secondary winding is concerned, the lower the resistance of its circuit the greater its contribution to the synchronizing effort.

While the arrangement of Fig. 2 permits of a better utilization of material at synchronism than does that of Fig. 1, yet at sub-synchronous speeds the induction motor torque conditions are more unbalanced in Fig. 2 than in Fig. 1. In the latter the unbalancing arises from the fact that the windings 16 and 20 normally contain more reactance than the winding 22 unless the reactness of the latter is purposely increased. In the former it is due to a symmetrical disposition of those windings which at sub-synchronous speeds are called upon to produce the induction motor torque. These drawbacks are avoided in Fig. 3 where the windings 14, 15, 16 are spaced as is usual for regular three-phase windings. Two of them, 14 and 15, are connected in parallel and to the brushes 10, 11, the third to the brushes 12, 13. The arrangement of Fig. 3 can be operated just like that of Fig. 2, but at sub-synchronous speeds the induction motor torque can be made entirely balanced and quite uniform, just as uniform as in any induction motor with a three phase primary, provided the adjustable resistances 17, 18, 19 are properly set.

In so far as the axis of the total unidirectional magnetization F produced by the secondary is concerned, it is in Figs. 2 and 3 due to the windings 14, 15 and 16 and it has in both cases been assumed that the resistances 17, 18 are so set that at synchronism the axis of F coincides with the axis of 16. This assumption was made in order to be able to show F in a definite position, it is to be understood that F, whether produced by one winding such as 20 or by a plurality of windings such as 14, 15, need not coincide with the axis of 16 but can be somewhat displaced from 16.

It is to be understood that a synchronous motor is a machine capable of operating at a constant and synchronous speed under varying load conditions and which does so operate. The synchronous motors described in this specification carry unidirectional ampereturns F on their secondary and unless the organization of the machine is such as to permit, with changing torque demand, (1) of an angular displacement between the axis of F and the axis of the resultant motor magnetization R, or (2) of a change in the magnitude of F, or (3) of said angular displacement and of said change in magnitude, the motor cannot and does not run at a constant and synchronous speed under varying load conditions.

It is further to be understood that by "synchronous torque" is meant a torque exerted by a synchronous motor when in normal operation and therefore when running synchronously under load. By "synchronizing torque" is meant any torque adapted to or capable of bringing up to synchronism a motor capable of operating synchronously under varying load conditions. It is, for instance, known that an ordinary polyphase induction motor is a non-synchronous machine the torque of which falls off very rapidly as synchronism is approached and actually becomes zero at synchronism. It is also known that a polyphase induction motor can be so modified as to make it capable of operating synchronously under varying load conditions. Any torque which, in a polyphase induction motor adapted to operate synchronously under varying load, will bridge the gap between the induction motor torque of the machine, which becomes zero at synchronism, and its synchronous torque is referred to as a "synchronizing torque".

A synchronous motor is said to be "compounded" when the unidirectional ampere-turns on the secondary are smaller at light than at heavy loads. This change in the unidirectional ampereturns with changing load affects the power factor at which the machine operates. The change can be such that the power factor remains practically constant throughout the synchronous load range of the motor, or it can be such that the power factor is a leading one at light loads, that this lead diminishes with increasing load and is converted into a lag near the maximum synchronous torque of the machine. Either of these "compounding characteristics" are popular and right now the last named is probably more in demand.

The invention in all its phases is equally applicable to separately excited motors, provided the exciter is one adapted to supply a plurality of voltages which are always of the slip frequency of the motor and therefore unidirectional when the motor runs synchronously.

In the larger machines and in order to protect the commutator and secure a perfectly balanced induction motor torque at starting, two or more of the secondary displaced windings can be shunted by means of resistances as shown in connection with winding 22 of Fig. 1.

It is immaterial whether the primary or the secondary is designed to revolve but useful to note that while a displacement of the brushes with rotation when the primary revolves is equivalent to a displacement of the brushes against rotation when the secondary revolves, yet in both cases the brushes are displaced against the direction of rotation of the revolving field produced by the primary.

A brush displacement against rotation of the primary or in the direction of rotation of the secondary is in either case a brush displacement in the direction of rotation of the primary revolving flux.

In order to make full use of the properties of the improved motor I prefer to design both members without defined polar projections, using a small air-gap and well distributed windings as is usual in good induction motor practice. In that way good starting, powerful and smooth synchronizing and high weight efficiency can be secured.

The reason for showing the commuted winding 9 as separate from the three phase winding 8 is to indicate that as a rule these two windings must be designed for very different voltages. In order to secure good commutation and avoid dangerously high voltages in the windings 14, 15 and 16 or 20 at starting, it is necessary to make the maximum brush voltage much smaller than even the lowest usual distribution voltage applied to 8. There are various known modifications of such windings and these may be used instead of the arrangement shown in the figures without modifying the mode of operation of my improved motor.

While theories have been advanced in connection with the machines referred to herein, this has been done with a view to facilitating their description and understanding but it is to be understood that I do not bind myself to these or any other theories.

It is clear that various changes may be made in the details of this disclosure without departing from the spirit of this invention, and it is, therefore, to be understood that this invention is not to be limited to the specific details here shown and described. In the appended claims I aim to cover all the modifications which are within the scope of my invention.

Having thus described the invention, what is claimed is:

1. The method of operating a motor which carries variable load at synchronous speed, comprising, producing a primary flux which revolves with respect to the primary, generating auxiliary voltages which near synchronism are phase displaced and of slip frequency and which become unidirectional at synchronism, impressing one auxiliary voltage on a circuit on the secondary to produce near synchronism and in cooperation with the primary flux a substantially unidirectional synchronizing torque, impressing different auxiliary voltages on different secondary circuits at synchronism, and causing the auxiliary voltages to so vary when the motor load varies as to produce in synchronous operation secondary unidirectional magnetizations which oppose each other at light motor loads and assist each other at higher motor loads.

2. The method of operating a motor which carries variable load at synchronous speed, comprising, producing auxiliary voltages which are of slip frequency and differ in phase near synchronism and become unidirectional at synchronism, causing one of the auxiliary voltages to increase in magnitude when the load on the synchronously operating motor increases, causing another auxiliary voltage to concurrently decrease to zero change polarity and thereafter increase in magnitude, and impressing the auxiliary voltages on circuits on the secondary of the motor to produce the secondary magnetization of the machine.

3. The method of operating a motor which carries variable load at synchronous speed, comprising, producing auxiliary voltages which are of slip frequency and differ in phase near synchronism and become unidirectional at synchronism, impressing one of the auxiliary voltages on displaced windings on the secondary of the motor, impressing another auxiliary voltage on a third secondary winding displaced from the first two, and adjusting the axis of the resultant auxiliary magnetization due to the first two secondary windings with respect to the axis of the magnetization produced by the third secondary winding.

4. A motor which carries variable load at synchronous speed, having a primary adapted to produce a primary flux which revolves with respect to the primary, a secondary having circuits in each of which a voltage is generated by the primary flux, a source adapted to make available auxiliary voltages which are of slip frequency and differ in phase near synchronism and become unidirectional at synchronism, means for impressing one of the auxiliary voltages on a secondary motor circuit and for adjusting the phase of said one voltage adapted to produce a substantially unidirectional synchronizing torque and a first unidirectional magnetization at synchronism, and means for impressing another auxiliary voltage on another secondary motor circuit and for adjusting the phase of said other voltage adapted to produce at synchronism a second unidirectional magnetization which so varies when the load on the motor varies as to oppose the first unidirectional magnetization at light loads and to assist it at greater loads.

5. A motor which carries variable load at synchornous speed, having a primary and a secondary, circuits on the secondary in inductive relation to the primary, a source adapted to make available auxiliary voltages which are unidirectional at synchronism and vary in magnitude when the load on the motor varies, and means for impressing said auxiliary voltages on the secondary circuits and for adjusting the rate at which said auxiliary voltages vary with the load, adapted to produce on the secondary of the motor and at synchronism unidirectional and substantially coaxial magnetizations which oppose each other at light loads and assist each other at greater loads.

6. A motor which carries variable load at synchronous speed, having a primary and a secondary, circuits on the secondary in inductive relation to the primary, a source adapted to make available auxiliary voltages which near synchronism are of slip frequency and differ in phase by a phase angle other than 90 degrees and which become unidirectional at synchronism, and means for impressing different auxiliary voltages on different secondary circuits to produce at synchronism substantially coaxial unidirectional magnetizations.

7. A motor which carries variable load at synchronous speed, having a primary and a secondary, a commuted winding on the primary, three windings on the secondary displaced by 120 electrical degrees and in inductive relation to the primary, two displaced sets of brushes cooperating with the commuted winding to make available auxiliary voltages which are of slip frequency near synchronism and become unidirectional at synchronism, one set of brushes being connected to a first winding on the secondary and the axis of said brushes being displaced from the perpendicular to the axis of said first winding, the other set of brushes being connected to the second and third windings on the secondary and also displaced from the perpendicular to the axis of said first winding on the secondary.

8. A motor which carries variable load at synchronous speed, having a primary member carrying a winding adapted to produce a flux which revolves with respect to the primary, a secondary member having three displaced windings in inductive relation to the primary flux, means adapted to make available auxiliary voltages which are of slip frequency and which differ in phase near synchronism and become unidirectional at synchronism, means for impressing one of the auxiliary voltages on two of said secondary windings, and means for impressing another auxiliary voltage on the third winding on the secondary.

9. A motor which carries variable load at synchronous speed, having a primary member carrying a winding adapted to produce a flux which revolves with respect to the primary, a secondary member having three windings displaced by 120 electrical degrees and in inductive relation to the primary flux, means adapted to make available auxiliary voltages which are of slip frequency and which differ in phase near synchronism and become unidirectional at synchronism, means for impressing one auxiliary voltage on two of said secondary windings, and means for impressing another auxiliary voltage on the third winding on the secondary.

10. A motor which carries variable load at synchronous speed, having a primary member carrying a winding adapted to produce a flux which revolves with respect to the primary, a secondary member having three displaced windings in inductive relation to the primary flux, means adapted to make available auxiliary voltages which are phase displaced and of slip frequency near synchronism and become unidirectional at synchronism, means for impressing one of said voltages on two of said secondary windings, to produce a resultant auxiliary magnetization, means for impressing the other voltage on the third secondary winding to produce a second auxiliary magnetization, and means for adjusting the axis of the resultant auxiliary magnetization with respect to the axis of the second auxiliary magnetization.

11. A motor which carries variable load at synchronous speed, having a primary and a secondary without defined polar projections, a commuted and another winding on the primary, said other winding being adapted for connection to an alternating current supply, two sets of brushes carried by the secondary and co-operating with the commuted winding on the primary, and compounding and exciting windings on the secondary adapted to produce substantially coaxial magnetizations, said compounding and exciting windings being respectively connected to different sets of brushes, the brushes connected to the compounding winding being positioned to collect at synchronism a voltage of one direction at one load and a voltage of the opposite direction at another load.

12. A motor which carries variable load at synchronous speed, having a primary and a secondary, a commuted winding on the primary three windings on the secondary displaced by 120 electrical degrees, two displaced sets of brushes co-operating with the commuted winding to make available auxiliary voltages which are of slip frequency near synchronism and become unidirectional at synchronism, one set of brushes being connected to one secondary winding and the other set being connected to the two other secondary windings.

13. A motor which carries variable load at synchronous speed, having a primary and a secondary, the primary being adapted to produce a primary flux which revolves with respect to the primary, a plurality of displaced windings on the secondary each having a slip frequency voltage generated in it by the primary flux, a source of auxiliary voltages of slip frequency and of different phases, means for impressing on two of said displaced windings an auxiliary voltage leading the slip frequency voltage generated in one of these windings and lagging behind the slip frequency voltage generated in the other of these windings, and means for impressing on another displaced secondary winding another auxiliary voltage.

14. A motor which carries variable load at synchronous speed, having a primary and a secondary, the primary being adapted to produce a primary flux which revolves with respect to the primary three windings on the secondary displaced by 120 electrical degrees and each having a slip frequency voltage generated in it by the primary flux, a source of auxiliary voltages of slip frequency and of different phases, means for impressing on two of said displaced windings an auxiliary voltage leading the slip frequency voltage generated in one of these windings and lagging behind the slip frequency voltage generated in the other of these windings, the angle of lead exceeding the angle of lag, and means for impressing on another displaced secondary winding another auxiliary voltage.

In testimony whereof I affix my signature this 21st day of March, 1924.

VALÈRE ALFRED FYNN.